US011930452B2

United States Patent
Meylan et al.

(10) Patent No.: US 11,930,452 B2
(45) Date of Patent: *Mar. 12, 2024

(54) TECHNIQUES FOR IMPROVING POWER CONSUMPTION STATE LATENCY IN WIRELESS COMMUNICATIONS

(71) Applicant: QUALCOMM Incorporated, San Diego, CA (US)

(72) Inventors: Arnaud Meylan, San Diego, CA (US); Vamsi Dokku, San Diego, CA (US); Amir Farajidana, Sunnyvale, CA (US); Alok Mitra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 17/369,351

(22) Filed: Jul. 7, 2021

(65) Prior Publication Data
US 2022/0022135 A1     Jan. 20, 2022

Related U.S. Application Data

(63) Continuation of application No. 16/155,664, filed on Oct. 9, 2018, now Pat. No. 11,082,922.

(51) Int. Cl.
*H04W 52/02*     (2009.01)
*H04L 69/324*    (2022.01)

(52) U.S. Cl.
CPC ....... *H04W 52/0229* (2013.01); *H04L 69/324* (2013.01)

(58) Field of Classification Search
CPC .................. H04W 52/0229; H04L 69/324
See application file for complete search history.

(56) References Cited

U.S. PATENT DOCUMENTS

| 2005/0034001 A1* | 2/2005 | Pontarelli ......... H04W 52/0251 713/320 |
| 2007/0109987 A1* | 5/2007 | Kohlmann ........ H04W 52/0225 370/320 |
| 2011/0199948 A1 | 8/2011 | Wang et al. |
| 2016/0099936 A1 | 4/2016 | Enke |
| 2017/0195957 A1* | 7/2017 | Debates ............ H04W 52/0254 |
| 2019/0104480 A1 | 4/2019 | Hasholzner et al. |
| 2020/0037247 A1* | 1/2020 | Liao .................. H04W 52/0219 |
| 2020/0112918 A1 | 4/2020 | Meylan et al. |

* cited by examiner

*Primary Examiner* — Ricky Q Ngo
*Assistant Examiner* — Stephen N Steiner
(74) *Attorney, Agent, or Firm* — ArentFox Schiff LLP

(57) ABSTRACT

Aspects described herein relate to instructing, from a layer of a modem processor, a host processor to utilize an increased power consumption state for processing data from a network node. The instructing can be performed based on transmitting a signal to the network node and/or receiving signals from the network node, and at a time that allows the host processor to wake up before receiving data from the modem processor for processing.

20 Claims, 8 Drawing Sheets

TECHNIQUES FOR IMPROVING POWER CONSUMPTION STATE LATENCY IN WIRELESS COMMUNICATIONS

CLAIM OF PRIORITY UNDER 35 U.S.C. § 119

This application is a Continuation of U.S. patent application Ser. No. 16/155,664, entitled "TECHNIQUES FOR IMPROVING POWER CONSUMPTION STATE LATENCY IN WIRELESS COMMUNICATIONS" filed on Oct. 9, 2018, which is assigned to the assignee hereof and hereby expressly incorporated by reference herein for all purposes.

BACKGROUND

Aspects of the present disclosure relate generally to wireless communication systems, and more particularly, to improving latency associated with switching between power consumption states in wireless communications devices.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

For example, 5G NR technologies may be introduced that utilize different frame structures and short processing time as compared to other wireless communication technologies. Additionally, application processors for wireless communication devices have become more complex and powerful, often requiring more time to switch power consumption states (e.g., to wake-up from a sleep mode) as compared to processors of previous wireless communication devices. Though use power consumption states is still desirable for facilitating conserving power of battery-powered devices, for example, the shortened processing time used in 5G NR may not allow sufficient time to switch a power consumption state of a more complex processor of a device when received data is provided to a higher layer application for processing. For example, the processor may not have enough time to wake-up once data is provided to an associated application, process the received data via the application, and transmit responding data in accordance with a timeline defined in 5G NR.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes receiving a signal from a network node, detecting, via a modem processor, one or more properties of the signal at a layer of the modem processor, instructing, from the layer of the modem processor and based on detecting the one or more properties of the signal, a host processor to utilize an increased power consumption state for processing data from the network node, and sending, subsequent to and based on instructing the host processor to utilize the increased power consumption state, the data received from the network node to the host processor.

In another example, A method for wireless communication is provided that includes transmitting, via a transceiver, a first signal to a network node, instructing, from a layer of a modem processor and based on detecting transmitting of the first signal to the network node, a host processor to utilize an increased power consumption state for processing data from the network node, receiving, via the transceiver, a second signal from the network node, and sending, subsequent to and based on instructing the host processor to utilize the increased power consumption state, data received in the second signal from the network node to the host processor.

In a further example, an apparatus for wireless communication is provided that includes a transceiver, a memory, and at least one processor communicatively coupled with the transceiver and the memory. The at least one processor is configured to receive a signal from a network node, detect one or more properties of the signal at a layer of a modem processor, instruct, based on detecting the one or more properties of the signal, a host processor to utilize an increased power consumption state for processing data from the network node, and send, subsequent to and based on instructing the host processor to utilize the increased power consumption state, the data received from the network node to the host processor.

In another example, an apparatus for wireless communication is provided that includes a transceiver, a memory, and at least one processor communicatively coupled with the transceiver and the memory. The at least one processor is configured to transmit, via the transceiver, a first signal to a network node, instruct, based on detecting transmitting of the first signal to the network node, a host processor to utilize an increased power consumption state for processing data from the network node, receive, via the transceiver, a second signal from the network node, and send, subsequent to and based on instructing the host processor to utilize the increased power consumption state, data received in the second signal from the network node to the host processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
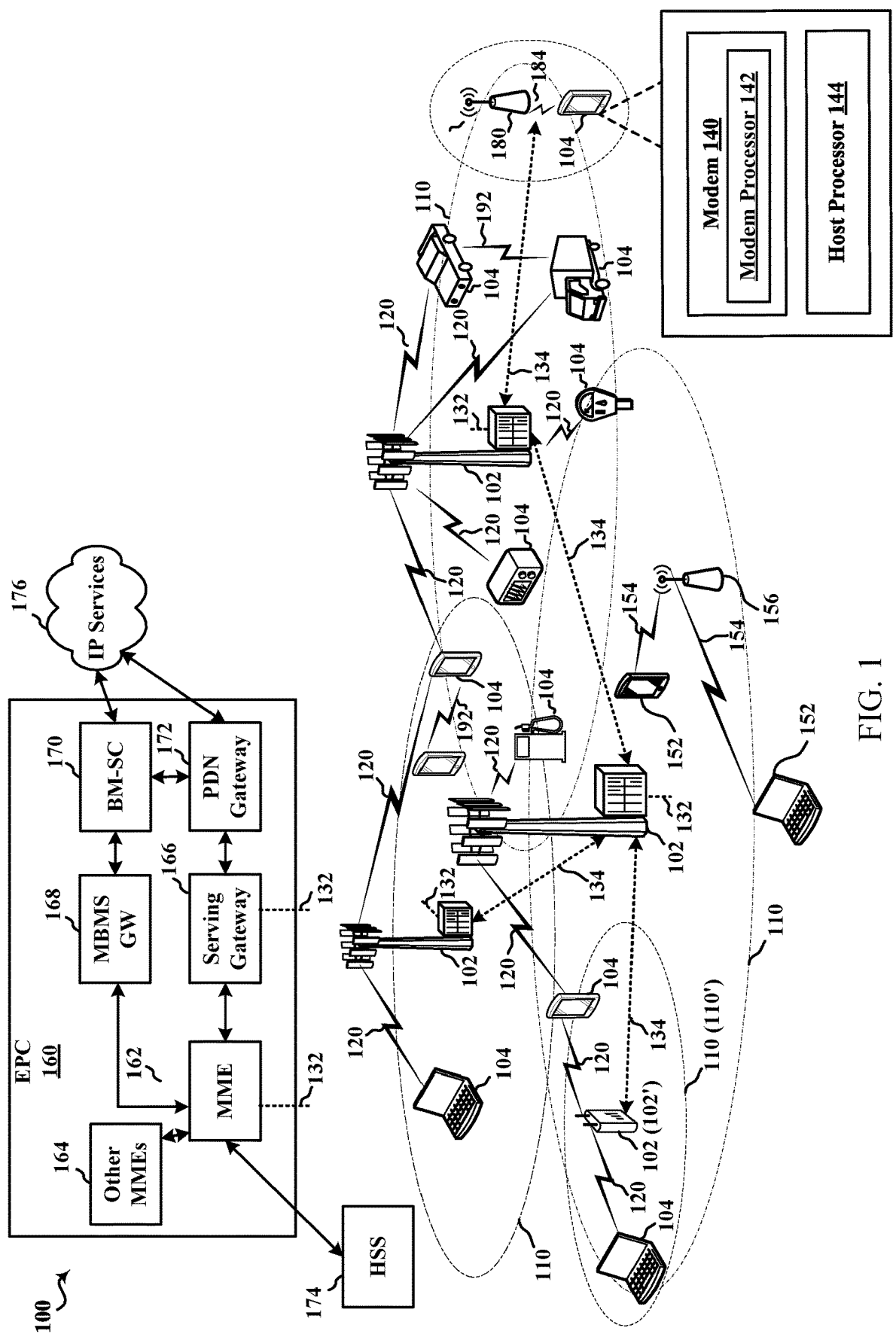
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to mitigating effects of latency in switching a power consumption state of a wireless communication device to allow more efficient processing of received communications. As wireless communication technologies evolve, new frame structures and shorter processing times are introduced, which can shrink allowable air interface latency. For example, long term evolution (LTE) can have a transmission time interval (TTI) duration of one millisecond (ms) and an air interface round trip latency of 12.00 ms. Newer technologies can have shorter durations, e.g., LTE short TTI (sTTI) can have a TTI duration around 0.142 ms and an air interface round trip latency around 1.71 ms, new radio (NR) with 15 kilohertz (KHz) subcarrier spacing (SCS) can have a TTI duration around 1 ms and an air interface round trip latency around 5.89 ms, NR with 30 KHz SCS can have a TTI duration around 0.5 ms and an air interface round trip latency around 3.06 ms, NR with 60 KHz SCS can have a TTI duration around 0.25 ms and an air interface round trip latency around 2.03 ms, and NR with 120 KHz SCS can have a TTI duration around 0.125 ms and an air interface round trip latency around 1.25 ms. Additionally, application processors continue to evolve into larger and more complex architectures with more layers of cache resulting in longer wakeup times (e.g., as high as 2-3 ms as compared to closer to 1 ms for some current production processors). Thus, as the processors become more complex and latency requirements become more stringent for wireless communication technologies, aspects described herein may allow for early wakeup of processors based on anticipated receipt of communications.

For example, modem processing for wireless communications in some technologies (e.g., LTE, fifth generation (5G) NR, etc.) involves at least some of the following steps at one or more communication layers: (1) receiving control channel; (2) receiving data; (3) decoding data; (4) processing data; (5) passing data to a host processor. A host processor of a device can operate in a low power consumption state (e.g., a sleep mode or similar state) to lessen resources utilized, and thus power consumed, by the host processor for a period of time. Typically, the device switches the host processor to an increased power consumption state to facilitate processing of received data once the data is passed to the host processor (e.g., at step 5 described above). Aspects described herein relate to switching the host processor to an increased power consumption state (e.g., waking the host processor) at an earlier step (e.g., at one or more of steps 1-4 described above). This can allow additional time for the host processor to wakeup such to prevent latency that may be caused by waiting for the host processor to wake up once data is already set for processing by the host processor. In addition, aspects described herein can provide improvement over other techniques including a brute force approach to holding a power lock in the host processor for the duration of the communication, which may not be power efficient and/or can exploit very short idle durations.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects described herein, an example wireless communication access network 100 includes at least one UE 104 with a modem 140 for communicating in a wireless network, a modem processor 142 to receive and decode wireless communications, and a host processor 144 to receive and further process decoded wireless communications at a higher layer (e.g., for an application), as described further herein. Further, wireless communication access network 100, also referred to as a wireless wide area network (WWAN), includes at least one base station 102 via which the UE 104 can communicate with one or more nodes of the wireless communication access network to communicate data corresponding to the service, and/or to communicate with one or more other UEs 104 (e.g., over a sidelink). The base station 102 can also have a modem for communicating in the wireless network.

The one or more UEs 104 and/or the one or more base stations 102 may communicate with other UEs and/or other base stations via an Evolved Packet Core (EPC) 160. The base stations 102 (which can be collectively referred to as Evolved Universal Mobile Telecommunications System (UMTS) Terrestrial Radio Access Network (E-UTRAN)) may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 156 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include factory equipment or nodes, as described above, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, host processor 144 may operate in a decreased or limited power consumption state for a period of time to conserve power, increase battery life, etc. When the modem 140 receives a wireless communication from a base station 102, another UE 104, etc., modem processor 142 may instruct the host processor 144 to enter an increased power consumption state to process the received wireless communication. As described herein, modem processor 142 may instruct the host processor 144 in this regard at one or more different points in the process of receiving the wireless communication, such as when control data is received or decoded, when the data is received or decoded, etc. In another example, modem processor 142 may instruct the host processor 144 to enter an increased power consumption state based on transmitting a communication to the base station 102, another UE 104, etc., that causes the base station 102, another UE 104, etc. to transmit the received wireless communication. In any case, the host processor 144 can be switched to an increased power consumption state to process received communications before the communications are provided to the host processor 144 to mitigate impact of delay resulting from switching the host processor 144 to the increased power consumption state.

Figure 2:
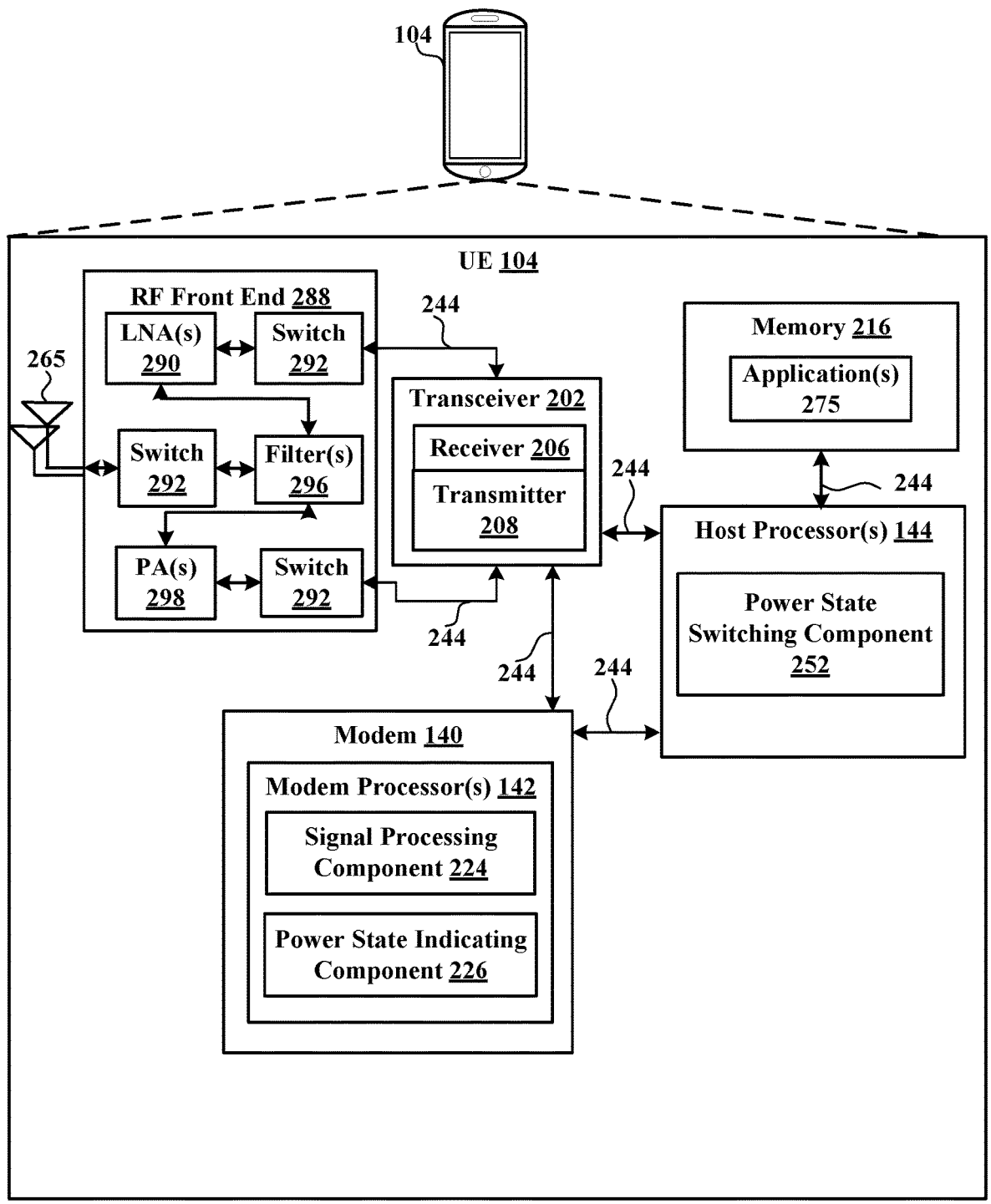
FIG. 2 is a block diagram illustrating an example of a UE, in accordance with various aspects of the present disclosure.
Figure 3:
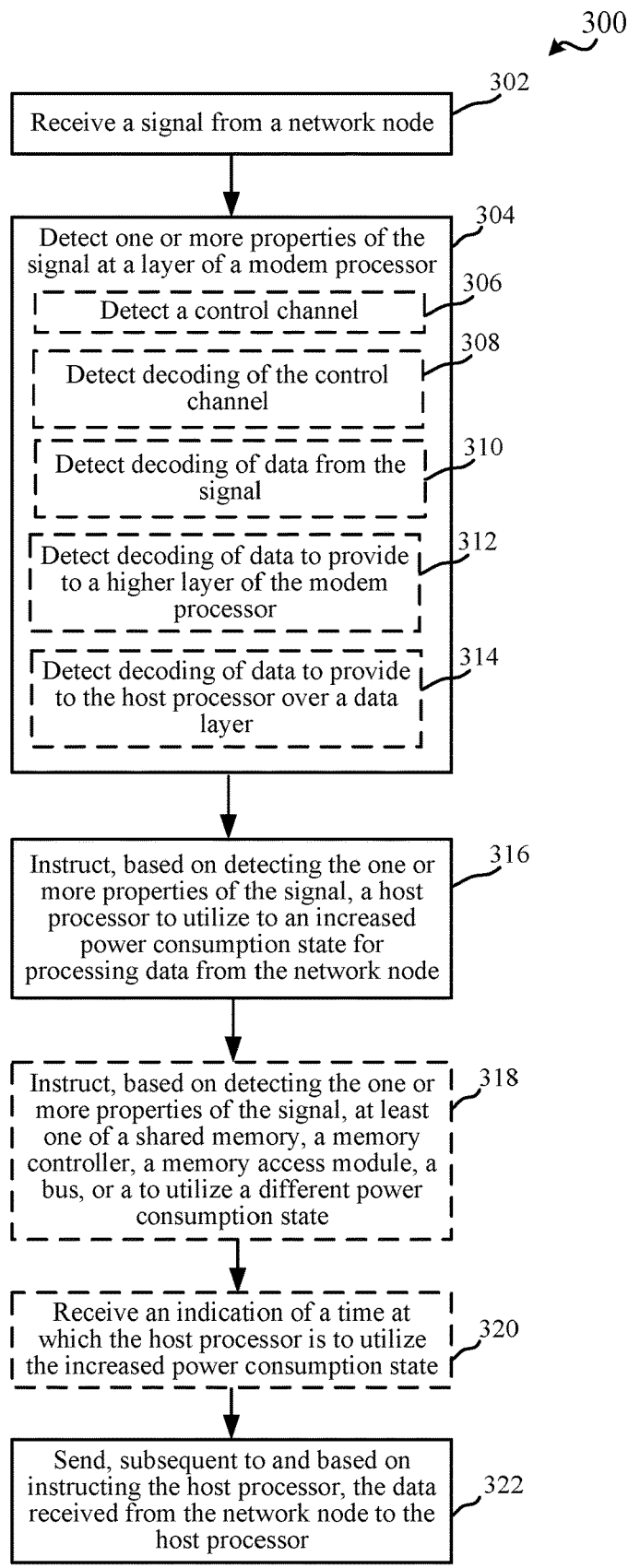
FIG. 3 is a flow chart illustrating an example of a method for instructing a host processor to enter an increased power consumption state, in accordance with various aspects of the present disclosure.
Figure 4:
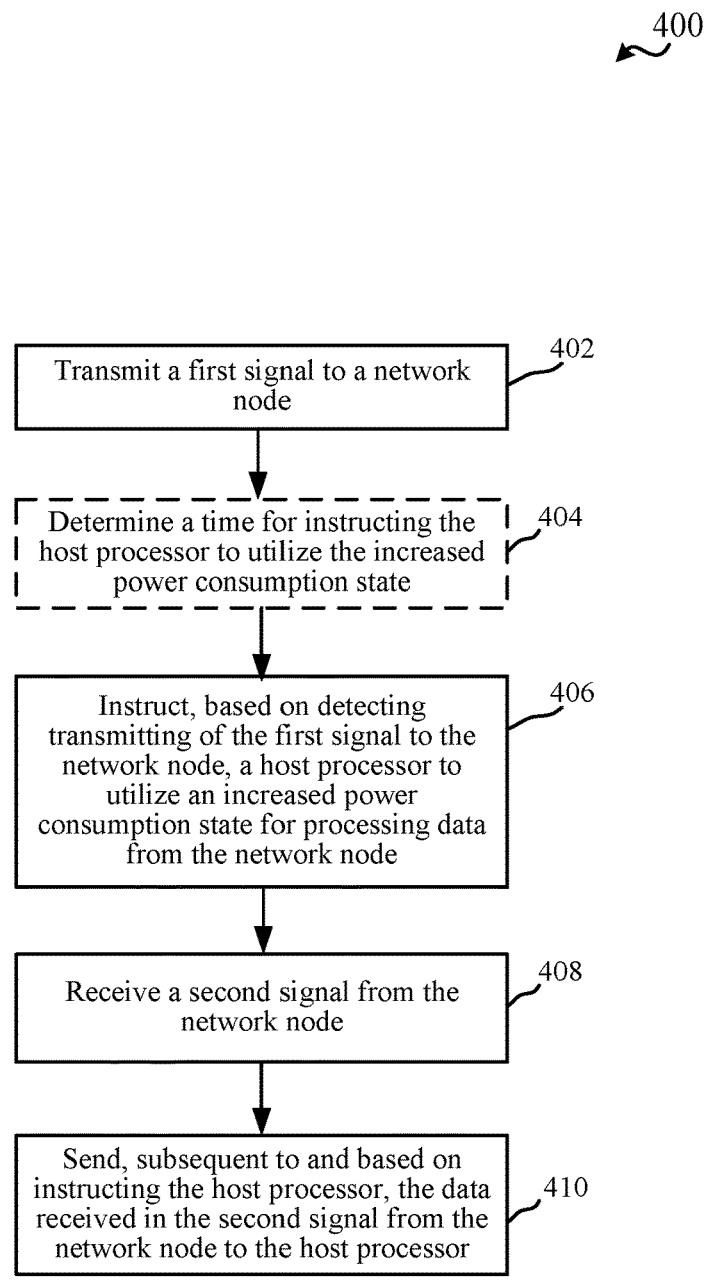
FIG. 4 is a flow chart illustrating an example of a method for instructing a host processor to enter an increased power consumption state based on a signal transmission, in accordance with various aspects of the present disclosure.
Figure 5:
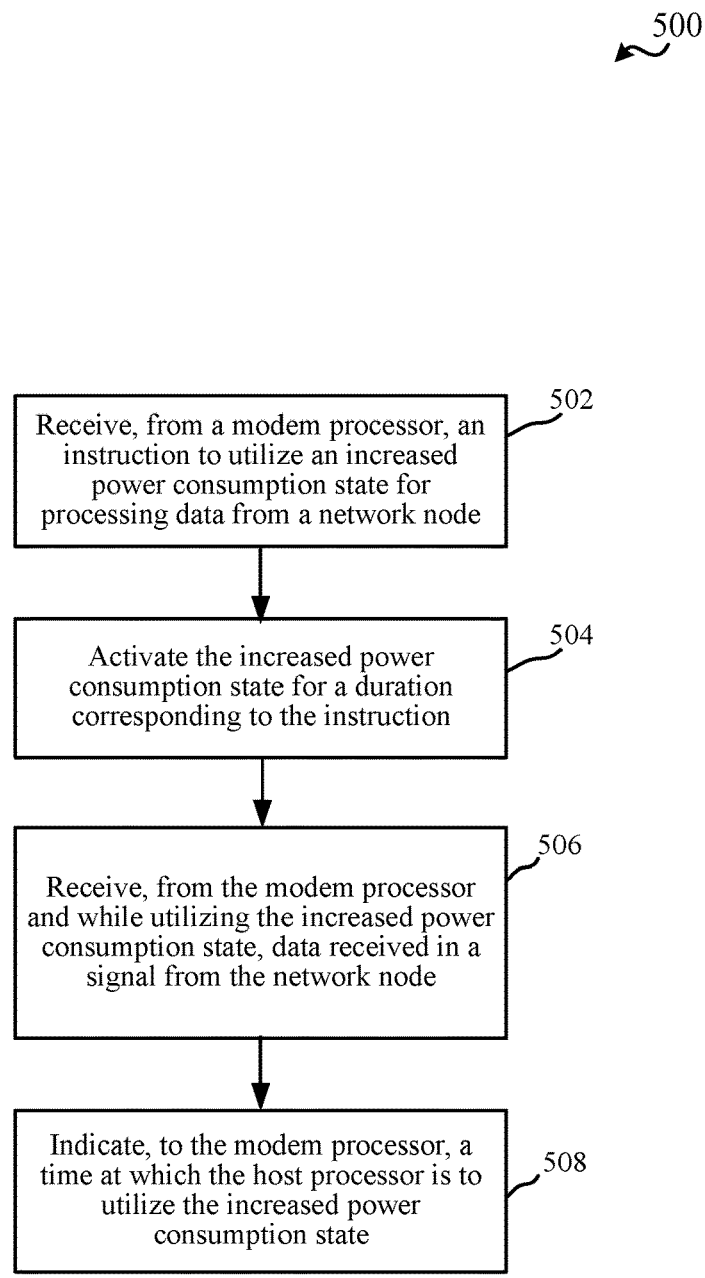
FIG. 5 is a flow chart illustrating an example of a method for indicating a time to remain in an increased power consumption state, in accordance with various aspects of the present disclosure.

Turning now to FIGS. 2-8, aspects are depicted with reference to one or more components and one or more methods that may perform the actions or operations described herein, where aspects in dashed line may be optional. Although the operations described below in FIGS. 3-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors, which may include a modem processor 142, host processor 144, etc., and memory 216 and transceiver 202 in communication via one or more buses 244, which may operate in conjunction with modem 140 and/or components thereof to enable one or more of the functions described herein related to switching power states of the host processor 144.

In an aspect, the one or more processors can include a modem 140 and/or can be part of the modem 140 that uses one or more modem processors 142. Thus, the various functions related to modem processor(s) 142 may be included in modem 140 and, in an aspect, can be executed by a single processor, while in other aspects, different ones of the functions may be executed by a combination of two or more different processors. Similarly, the functions related to the host processor(s) 144 can be executed by a single processor, while in other aspects, different ones of the functions may be executed by a combination of two or more different processors. For example, in an aspect, the one or more processors may include any one or any combination of a modem processor, or a baseband processor, or a digital signal processor, or a transmit processor, or a receiver processor, or a transceiver processor associated with transceiver 202. In other aspects, some of the features of the one or more processors and/or modem 140 associated with modem processor(s) 142 may be performed by transceiver 202.

Also, memory 216 may be configured to store data used herein and/or local versions of applications 275 or one or more components, such as a signal processing component 224, power state indicating component 226, power state switching component 252, etc. being executed by at least one processor. Memory 216 can include any type of computer-readable medium usable by a computer or at least one processor, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining signal processing component 224, power state indicating component 226, power state switching component 252, and/or data associated therewith, when UE 104 is operating at least one processor to execute such components.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, SNR, RSRP, RSSI, etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or a processor.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the modem processor(s) 142, host processor(s) 144, etc. may correspond to one or more of the processors described in connection with the UE in FIG. 9.

Similarly, the memory 216 may correspond to the memory described in connection with the UE in FIG. 9.

FIG. 3 illustrates a flow chart of an example of a method 300 for instructing a host processor to enter an increased power consumption state. In an example, a UE 104, and/or more specifically one or more modem processors 142, can perform the functions described in method 300 using one or more of the components described in FIGS. 1-2.

In method 300, at Block 302, a signal can be received from a network node. In an aspect, modem processor(s) 142, e.g., in conjunction with memory 216, transceiver 202, modem 140, etc., can receive the signal from the network node. As described further herein, this can include receiving a data signal (e.g., a signal corresponding to a data channel communication, such as a physical downlink shared channel (PDSCH) communication, PSSCH communication, etc.), a corresponding control signal (e.g., a signal corresponding to a control communication for the data communication, such as a physical downlink control channel (PDCCH) communication, PSSCH communication, etc.), and/or the like. For example, modem processor(s) 142 can receive the signal from the network node where the network node can be a base station 102, another UE 104, etc., and/or may receive the signal in response to a signal transmitted by the UE 104 to the network node (e.g., to the base station 102, another UE 104, etc.) over one or more channels (such as a physical uplink control channel (PUCCH), physical uplink shared channel (PUSCH), PSSCH, PSCCH, etc.).

In method 300, at Block 304, one or more properties of the signal can be detected at a layer of a modem processor. In an aspect, signal processing component 224, e.g., in conjunction with memory 216, transceiver 202, modem 140, modem processor(s) 142, etc., can detect the one or more properties of the signal at the layer of the modem processor. For example, the layer may correspond to a physical (PHY) layer, media access control (MAC) layer, data layer (e.g., internet protocol (IP) layer), etc., provided by the modem processor(s) 142 for facilitating network communications. As described above and further herein, various properties of the signal can cause the modem processor(s) 142 to instruct the host processor(s) 144 to enter an increased power consumption state such to allow the host processor(s) 144 an adequate amount of time to enter the state (e.g., and/or prepare to enter the state) before receiving data from the signal, or another signal received from the network node, for processing.

For example, detecting the one or more properties at Block 304 can optionally include, at Block 306, detecting a control channel. In an aspect, signal processing component 224, e.g., in conjunction with memory 216, transceiver 202, modem 140, modem processor(s) 142, etc., can detect the control channel. For example, this can include detecting receipt of a signal that includes control data for the UE 104 (e.g., based on locating control data in a common search space or a UE-specific search space using an identifier assigned to the UE 104, etc.), detecting metrics of the received signal including control data achieving associated thresholds (e.g., a signal energy or quality, such as received signal strength indicator (RSSI), signal-to-noise ratio (SNR), etc., achieving associated threshold(s)), and/or the like.

In another example, detecting the one or more properties at Block 304 can optionally include, at Block 308, detecting decoding of the control channel. In an aspect, signal processing component 224, e.g., in conjunction with memory 216, transceiver 202, modem 140, modem processor(s) 142, etc., can detect decoding of the control channel. For example, this can include detecting successful decoding of PDCCH received from a base station, PSCCH received from another UE 104, etc. Moreover, in this example, signal processing component 224 can determine that the control data corresponds to a data signal to be received, which can include determining that the control channel indicates/assigns data channel (e.g., PDSCH) resources. Waking up the host processor(s) 144 based on control channel related detections can be earlier than based on other detections described below, and thus may increase a chance of an unnecessary wakeup, but can provide for reduced latency on the part of the host processor(s) 144 in transitioning to the increased power consumption state. In addition, the control channel detections of Blocks 306 and 308 may be performed at a PHY/MAC layer of the modem processor(s) 142. Moreover, waking up after PDCCH is decoded can save about 2 ms for LTE (which is similar to application processor wakeup time) and down to about 0.3 ms for NR with 120 KHz sub-carrier spacing. An approximate timeline for processing PDSCH can be:

| Technology | TTI Duration [ms] | PDSCH Decode time [ms] |
|---|---|---|
| LTE | 1 | 2.00 |
| LTE sTTI | 0.142 | 0.28 |
| NR with 15 KHz SCS | 1 | 1.03 |
| NR with 30 KHz SCS | 0.5 | 0.56 |
| NR with 65 KHz SCS | 0.25 | 0.46 |
| NR with 120 KHz SCS | 0.125 | 0.31 |

In another example, detecting the one or more properties at Block 304 can optionally include, at Block 310, detecting decoding of data from the signal. In an aspect, signal processing component 224, e.g., in conjunction with memory 216, transceiver 202, modem 140, modem processor(s) 142, etc., can detect decoding of data from the signal. As described, for example, this can include detecting decoding a data channel, such as a PDSCH, PSSCH, etc., which can include data for providing to one or more applications executing on the host processor(s) 144. Moreover, for example, this can include determining that the decoded data corresponds to a previously received control channel (e.g., determining that the decoded data is received over resources granted in a previously received control channel, which can be the control channel detected in Block 306 and/or 308). For example, waking up the host processor(s) 144 based on successful decoding, in this regard, can indicate that the signal is successfully HARQ decoded.

In another example, detecting the one or more properties at Block 304 can optionally include, at Block 312, detecting decoding of data to provide to a higher layer of the modem processor. In an aspect, signal processing component 224, e.g., in conjunction with memory 216, transceiver 202, modem 140, modem processor(s) 142, etc., can detect decoding of the data to provide to the higher layer of the modem processor. For example, signal processing component 224 can detect successful decoding of the data signal at a PHY/MAC layer, (e.g., layer 2 complete) and/or corresponding sending of MAC protocol data units (PDU) to a higher layer (e.g., radio link control (RLC) layer, packet data convergence protocol (PDCP) layer, etc.). For example, waking up the host processor(s) 144 based on detecting providing of the signal or related PDUs to the higher layer, in this regard, can avoid waking up the host processor(s) 144 for control plane traffic associated with the lower layers, which can again lessen chance of unnecessary wakeup, but may allow less time to wake up the host processor(s) 144 as compared to control channel related detections.

In another example, detecting the one or more properties at Block 304 can optionally include, at Block 314, detecting decoding of data to provide to the host processor over a data layer. In an aspect, signal processing component 224, e.g., in conjunction with memory 216, transceiver 202, modem 140, modem processor(s) 142, etc., can detect decoding of the data to provide to the host processor over the data layer (e.g., an internet protocol (IP) layer). In one example, this can include detecting that a destination IP address in the IP packet of the signal matches an IP address associated with the host processor(s) 144. In this example, the signal processing component 224 can detect sending of packets to the data layer (e.g., from a PDCP layer) at the modem processor(s) 142 before the modem processor(s) 142 transfers the packets to the host processor(s) 144. This can again lessen a chance of unnecessary wakeup as it can allow for ensuring that the packet is intended for the host processor(s) 144, while providing a shortened window for waking up the host processor(s) 144 when compared to other detections described above.

Referring to the above time savings, At T0, PDCCH can be received. Thus, for LTE, T0+2 ms can be when PDSCH is received, and waking-up the host processor(s) after decoding PDSCH can cost approximately 2 ms. Similarly, waking-up the host processor(s) after L2 processing can cost an addition 0.1 ms, and waking-up the host processor(s) after IP processing can cost another 0.1 ms. Thus, when to wake the host processor(s) 144 can be balanced based on the chance of unnecessary wakeup, the associated time costs, and/or the wakeup latency of the host processor(s) 144.

In method 300, at Block 316, a host processor can be instructed, based on detecting the one or more properties of the signal, to utilize an increased power consumption state for processing data from the network node. In an aspect, power state indicating component 226, e.g., in conjunction with memory 216, transceiver 202, modem 140, modem processor(s) 142, etc., can instruct, based on signal processing component 224 detecting the one or more properties of the signal, the host processor to utilize an increased power consumption state for processing data from the network node. For example, power state indicating component 226 can send a command to the host processor(s) 144 to cause the host processor(s) 144 to enter the increased power consumption state. Moreover, for example, the instruction can relate to entering the increased power consumption state to process data received in the signal at Block 302 and/or in a subsequent signal, depending on the detection at Block 304, as described herein.

As described, for example, the host processor(s) 144 can enter a decreased power consumption state after a period of time, based on metrics related to receiving communications (e.g., a discontinuous receive cycle), etc., where the decreased power consumption state can include removing power from one or more portions of the host processor(s) 144 and/or other components of the UE 104. In this example, host processor(s) 144 can, in the decreased power consumption state, keep consistent or intermittent power to a mechanism to allow waking up the host processor(s) 144 (e.g., by a command from the modem processor(s) 142 and/or other components). The instruction from the modem processor(s) 142 may include an indication to enter a specific power consumption state, a full power state, etc., and/or may indicate an amount of time for which the host processor(s) 144 is to remain in the increased power consumption state (e.g., to handle uncertainty on modem processing time, data transfer time, etc.), a start time at which the host processor(s) 144 are to begin operating in the increased power consumption state, and/or the like. In this example, the host processor(s) 144 can transition from a decreased power consumption state to the increased power consumption state while the modem processor(s) 142 continues to receive/process signals that include data for providing to the host processor(s) 144, thus allowing the host processor(s) 144 time to wake up without delaying data processing by the host processor(s) 144.

Moreover, in one example, instructing the host processor(s) 144 to wakeup may be based on other considerations as well, such as a type of data call associated with the received signals (e.g., instruct the host processor(s) 144 to wake up for embedded calls that use the host processor(s) 144, but not for tethered calls that use other processors in the UE 104 or a system to which the UE 104 is connected). In another example, instructing the host processor(s) 144 to wakeup may be based on a wireless technology in use (e.g., 5G NR, LTE, etc.) or services, such as voice-over-IP, VR, etc. In another example, instructing the host processor(s) 144 to wakeup may be based on a TTI duration, type of radio bearers active (e.g., guaranteed bit rate (GBR) versus best efforts bearers), size of a received transport block (e.g., if less than a threshold, the data may be a fragment, and can wakeup the host processor(s) 144 if the RLC layer is not waiting for a fragment), and/or the like. In another example, instructing the host processor(s) 144 to wakeup may be based on a last time the host processor(s) 144 were known to be in the increased power consumption state (e.g., wakeup duration can depend on a time in a sleep or decreased power consumption state). In another example, instructing the host processor(s) 144 to wakeup may be based on a latency requirement of the UE 104, of a corresponding bearer, of a corresponding wireless technology, etc. In another example, instructing the host processor(s) 144 to wakeup may be based on quality of the received signal, for example, a SNR of PDCCH, PDSCH compared to modulation and coding scheme, etc. In this example, where SNR is low, likelihood of successful decoding can be low, and thus the modem processor(s) 142 may not bother with waking the host processor(s) 144.

In method 300, optionally at Block 318, at least one of a shared memory, a memory controller, a memory access module, or a bus can be instructed, based on detecting the one or more properties of the signal, to utilize a different power consumption state. In an aspect, power state indicating component 226, e.g., in conjunction with memory 216, transceiver 202, modem 140, modem processor(s) 142, etc., can instruct, based on detecting the one or more properties of the signal, at least one of a shared memory, a memory controller, a memory access module, a bus/peripheral component interconnect express (PCIe), etc. to utilize the different power consumption state. For example, power state indicating component 226 can instruct one or more of these components to also increase power consumption for processing data received from the network node.

In method 300, optionally at Block 320 (e.g., in order to handle the variable processing time of the various entities involved), an indication of a time at which the host processor is to utilize the increased power consumption state can be received. In an aspect, power state indicating component 226, e.g., in conjunction with memory 216, transceiver 202, modem 140, modem processor(s) 142, etc., can receive an indication of a time at which the host processor is to utilize the increased power consumption state. In this example, modem processor(s) 142 can determine a time window when it is able to send data received from the network node to the host processor(s) 144 for processing.

In method 300, at Block 322, the data received from the network node can be sent to the host processor, subsequent to and based on instructing the host processor. In an aspect, modem processor(s) 142, e.g., in conjunction with memory 216, transceiver 202, modem 140, etc., can send, subsequent to and based on instructing the host processor, the data received from the network node to the host processor. As described, in this regard, modem processor(s) 142 can send data from the signal received in Block 302, where the signal includes the data, or data from another signal where the signal includes control data for the signal, etc. In this regard, the host processor(s) 144 can transition to the increased power consumption state (or at least begin transitioning to the increased power consumption state) as the data is being received and/or processed.

Figure 6:
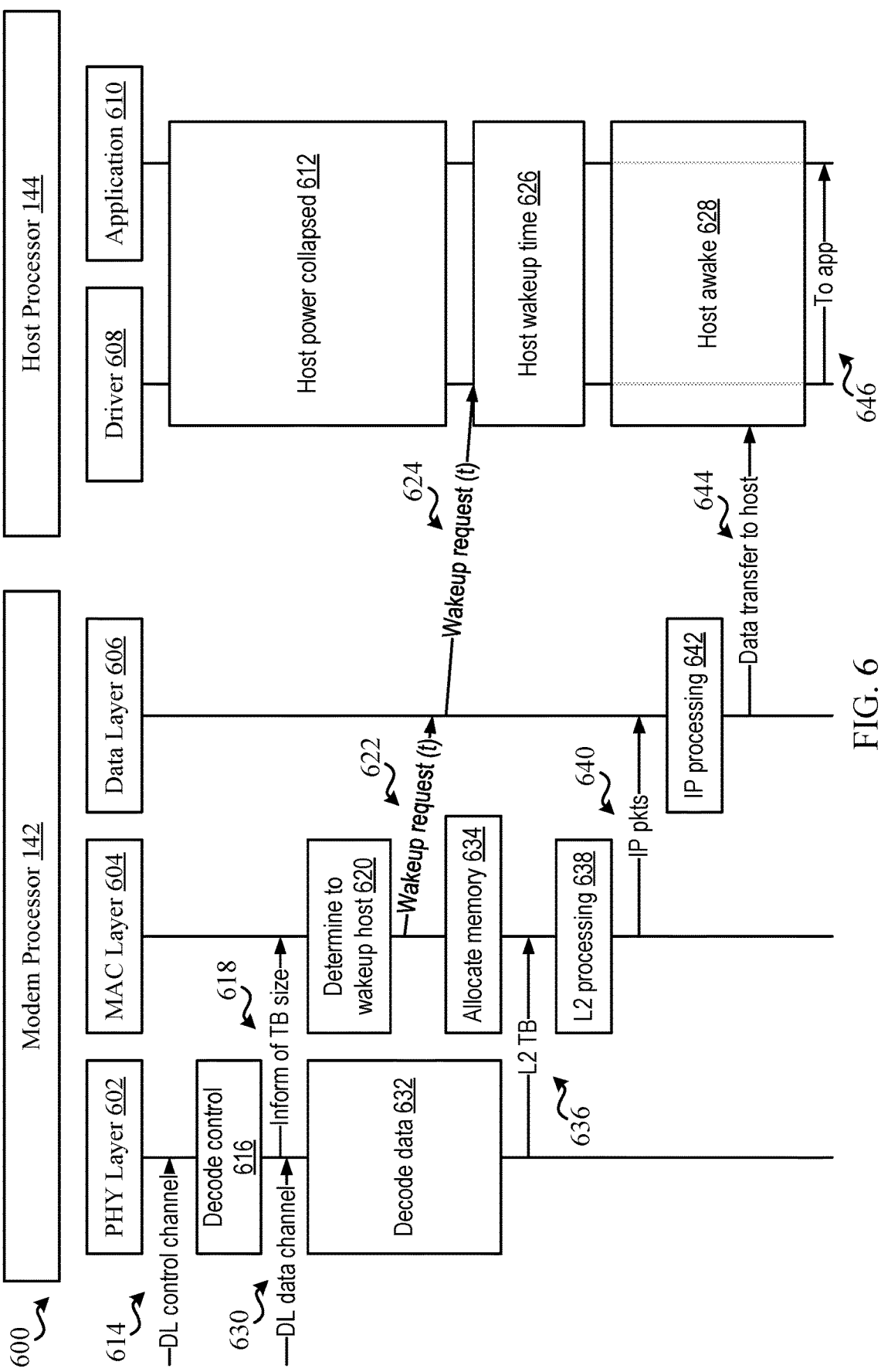
FIG. 6 illustrates an example of a modem processor and host processor architecture for instructing the host processor to enter an increased power consumption state, in accordance with various aspects of the present disclosure.

A specific example is depicted in FIG. 6, which illustrates an example of an architecture 600 of a UE 104 having a modem processor 142 and a host processor 144. Though described with respect to one modem processor 142 and one host processor 144 for ease of explanation, a UE 104 may have multiple modem processors and/or multiple host processors, as described herein. For example, modem processor 142 can operate on multiple layers, including a PHY layer 602 (also referred to as layer 1 (L1)), MAC layer 604 (also referred to as layer 2 (L2)), and a data layer 606 (e.g., an IP layer). Host processor 144 can include a driver 608 for communicating with the modem processor 142 and an application 610 that utilizes the driver 608 to communicate with the modem processor 142 to receive signals from other devices, as described. In this example, the host processor 144 can operate in a host power collapsed state 612, which can be a decreased power consumption state. In this state, as described, the host processor 144 can power down one or more components and/or may leave power to a component for receiving a wakeup command (e.g., from modem processor 142 or other components). Moreover, as described, the host power collapsed state 612 can be triggered by not receiving communications for a period of time, not otherwise performing processing for one or more applications for a period of time, triggered based on a state of the modem processor 142, etc.

In this example, the PHY layer 602 can receive a downlink control channel 614 from another device via a transceiver (not shown), and can decode control data from the downlink control channel at 616. The PHY layer 602 can then inform the MAC layer 604 of a transport block (TB) size corresponding to the data. In this example, the MAC layer 604 may determine to wake up the host processor at 620 based on detecting decoding of the control channel by the PHY layer 602 (e.g., which may be based on receiving the TB size), such to parallelize modem processing and host wakeup, as described herein. In this example, MAC layer 604 can send a wakeup request 622 to the data layer 606 for forwarding to the driver 608 operating on the host processor 144. This can cause the driver 608 to switch the host processor 144 to an increased power consumption state, which may take place over host wakeup time 626 (also referred to as host wakeup latency), and the host processor 144 can be in the increased power consumption state (e.g., woken up) by 628. During the host wakeup time 626, the modem processor 142 can continue to receive and process data to be provided to the host processor 144.

For example, at 630, the modem processor 142 can receive a downlink data channel, which may be received over shared data channel resources granted by a resource grant in the control channel decoded at 616. The PHY layer 602 can decode the data at 632, and the MAC layer 604 can allocate memory for processing the decoded data at 634. In addition, for example, the PHY layer 602 can indicate a L2 TB size at 636, and MAC layer 604 can begin L2 processing of the decoded data at 638 to generate one or more PDUs to provide to the data layer 606 for forming IP packets. MAC layer 604 can send the PDUs at IP packet to the data layer 606 and 640. Data layer 606 can perform IP processing of the IP packets at 642 to obtain the data for providing to the host processor 144, and can transfer the data to the host processor 144 at 644. The driver 608 can receive the data, and the host can be awake at this time. The driver 608 can transfer the data to the application 610.

As described above, in one example, the modem processor 142 can instruct the host processor 144 to wake up after decoding of the control channel at 616, as depicted. In another example, however, modem processor 142 can similarly instruct the host processor 144 to wakeup (e.g., transition to an increased power consumption state) after and/or based on PHY layer 602 receiving the control channel at 614 (e.g., and/or based on determining that the control channel achieves a threshold signal energy/quality). In another example, modem processor 142 can similarly instruct the host processor 144 to wake up after and/or based on PHY layer 602 receiving the data channel at 630 (e.g., and/or based on determining that the data channel achieves a threshold signal energy/quality and/or is associated with the control channel received at 614). In another example, modem processor 142 can similarly instruct the host processor 144 to wake up after and/or based on MAC layer 604 completing L2 processing at 638. In another example, modem processor 142 can similarly instruct the host processor 144 to wake up after and/or based on data layer 606 completing IP processing at 642.

FIG. 4 illustrates a flow chart of another example of a method 400 for instructing a host processor to enter an increased power consumption state. In an example, a UE 104, and/or more specifically one or more modem processors 142, can perform the functions described in method 400 using one or more of the components described in FIGS. 1-2.

In method 400, at Block 402, a first signal can be transmitted to a network node. In an aspect, modem processor(s) 142, e.g., in conjunction with memory 216, transceiver 202, modem 140, etc., can transmit the first signal to the network node. As described further herein, this can include transmitting a request signal (e.g., to the base station 102, another UE 104, etc.) over one or more channels (such as a physical uplink control channel (PUCCH), physical uplink shared channel (PUSCH), PSSCH, PSCCH, etc.), to receive a corresponding response signal.

In method 400, optionally at Block 404, a time for instructing the host processor to utilize the increased power consumption state can be determined. In an aspect, power state indicating component 226, e.g., in conjunction with memory 216, transceiver 202, modem 140, modem processor(s) 142, etc., can determine the time for instructing the host processor to utilize the increased power consumption state. For example, power state indicating component 226 can determine the time as a delay from a current time and/or from a time at which the signal is transmitted. For example, power state indicating component 226 can determine the time, such as a start time, an amount of time, etc., based on one or more of the transmission time of transmitting the signal at Block 402, the characteristics of the wireless communication system such as a round trip time (RTT) for a signal send by the UE 104 to be received at the network node, the expected network latency and server processing time and/or a response signal to be received by the UE 104, a downlink processing time to process the response signal received by the UE 104, and/or a wakeup time associated with the host processor(s) 144. In one example, power state indicating component 226 can compute the time at which to instruct the host processor(s) 144 to wakeup based on adding and/or subtracting one or more of the above values to the time the signal is transmitted to the network node at Block 402 (e.g., transmit time+RTT+downlink processing time−host wakeup time).

In method 400, at Block 406, a host processor can be instructed to utilize an increased power consumption state for processing data from the network node based on detecting transmitting of the first signal. In an aspect, power state indicating component 226, e.g., in conjunction with memory 216, transceiver 202, modem 140, modem processor(s) 142, etc., can instruct, based on detecting transmitting of the first signal to the network node, the host processor to utilize an increased power consumption state for processing data from the network node. For example, power state indicating component 226 can instruct the host processor(s) 144 after the determined time has elapsed and/or at or after the time of transmitting the first signal to the network node. In any case, the host processor(s) 144 can begin waking up to receive response communications from the network node. This may be beneficial in NR technologies having low latency properties in communications (e.g., such that the modem decode time may be shorter than a wakeup time of the host processor(s) 144).

For example, latency sensitive traffic can originate from the host processor and go to a server (e.g., in a network accessible by a base station 102) for processing and returns to the host (e.g., virtual reality (VR) traffic). Thus, based on seeing an uplink transmission from the UE 104, power state indicating component 226 can schedule the host processor(s) 144 wakeup at or near an expected time of downlink arrival of data in response to the uplink transmission. For example, an IP flow identifier can be associated with waking up the host processor(s) 144 such that when the modem processor(s) 142 detect an uplink communication with the IP flow identifier for low latency traffic (e.g., a 5-tuple identifier), the power state indicating component 226 can transmit the instruction to the host processor(s) 144. In another example, this may be linked to quality-of-service (QoS) level for the IP flow (e.g., in 3GPP), such that when modem processor(s) 142 detect uplink data transmission that is mapped to a radio bearer or IP flow having a QoS level indicating low latency, power state indicating component 226 can instruct the host processor(s) 144 to wakeup. Moreover, the instruction can originate from the modem L2 or IP layer, as described, and/or on the host processor(s) 144 driver layer. In one example, though shown and described as occurring in the modem processor(s) 142, the host processor(s) 144 can detect the uplink transmission sent to the modem processor(s) 142 and can accordingly schedule the wakeup time for the host processor(s) 144.

In method 400, at Block 408, a second signal can be received from the network node. In an aspect, modem processor(s) 142, e.g., in conjunction with memory 216, transceiver 202, modem 140, etc., can receive the second signal from the network node. For example, this can include receiving a data signal (e.g., a signal corresponding to a data channel communication, such as a physical downlink shared channel (PDSCH) communication, PSSCH communication, etc.), a corresponding control signal (e.g., a signal corresponding to a control communication for the data communication, such as a physical downlink control channel (PDCCH) communication, PSCCH communication, etc.), and/or the like. For example, modem processor(s) 142 can receive the signal from the network node where the network node can be a base station 102, another UE 104, etc., and may receive the second signal in response to the first signal transmitted to the network node at Block 402.

In method 400, at Block 410, the data received in the second signal from the network node can be sent to the host processor, subsequent to and based on instructing the host processor. In an aspect, modem processor(s) 142, e.g., in conjunction with memory 216, transceiver 202, modem 140, etc., can send, subsequent to and based on instructing the host processor, the data received in the second signal from the network node to the host processor. As described, in this regard, modem processor(s) 142 can send data from the second signal received in Block 408, where the signal includes the data, etc. In this regard, the host processor(s) 144 can transition to the increased power consumption state based on transmitting the first signal, and can be available to process data received at Block 408.

Figure 7:
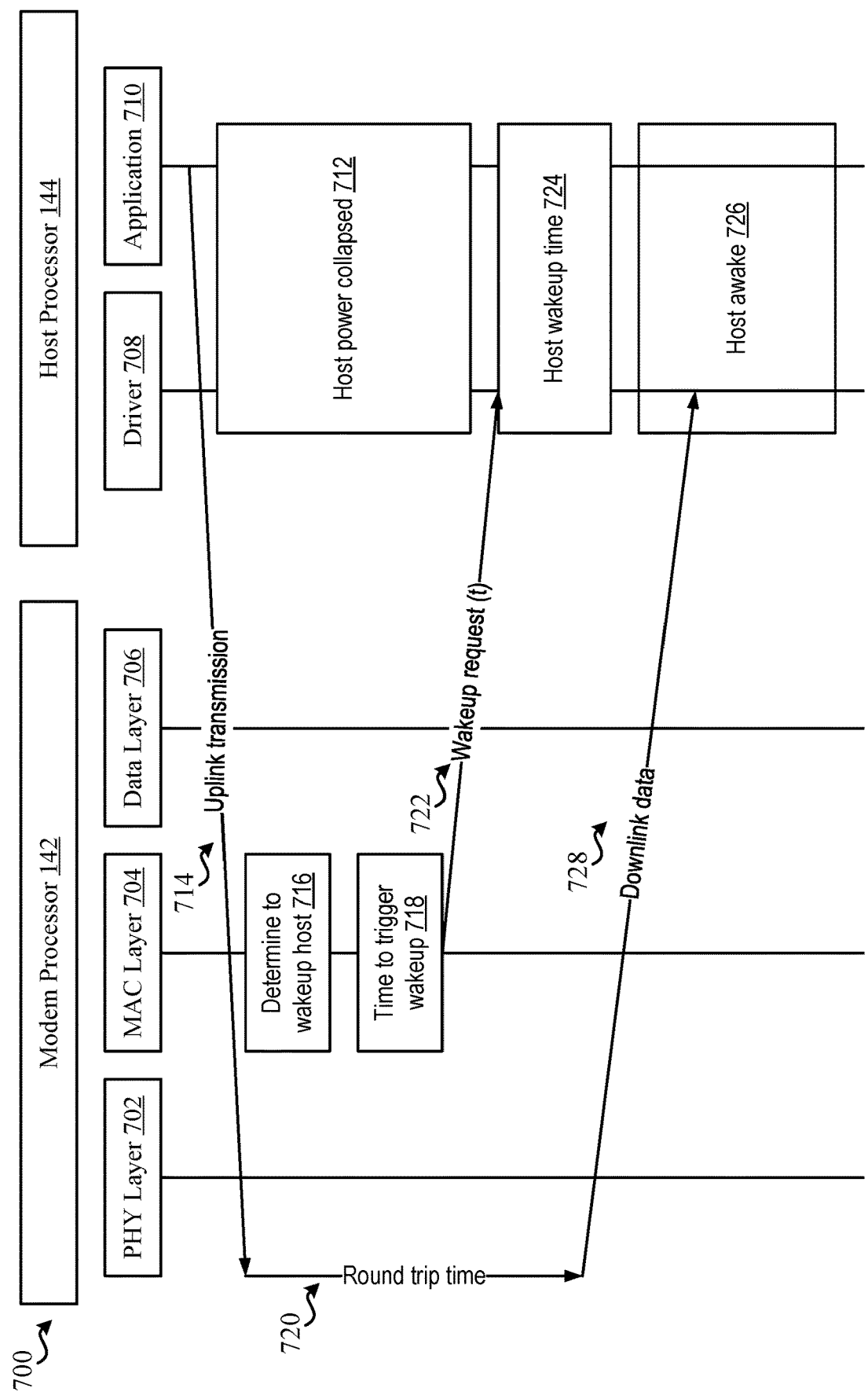
FIG. 7 illustrates an example of a modem processor and host processor architecture for instructing the host processor to enter an increased power consumption state based on a signal transmission, in accordance with various aspects of the present disclosure.

A specific example is depicted in FIG. 7, which illustrates an example of an architecture 700 of a UE 104 having a modem processor 142 and a host processor 144. Though described with respect to one modem processor 142 and one host processor 144 for ease of explanation, a UE 104 may have multiple modem processors and/or multiple host processors, as described herein. For example, modem processor 142 can operate on multiple layers, including a PHY layer 702, MAC layer 704, and a data layer 706 (e.g., an IP layer). Host processor 144 can include a driver 708 for communicating with the modem processor 142 and an application 710 that utilizes the driver 708 to communicate with the modem processor 142 to receive signals from other devices, as described. In this example, the host processor 144 can operate in a host power collapsed state 712, which can be a decreased power consumption state. In this state, as described, the host processor 144 can power down one or more components and/or may leave power to a component for receiving a wakeup command (e.g., from modem processor 142 or other components). In an example, the host power collapsed state 712 can be triggered based at least in part on the application sending an uplink transmission to the modem processor 142 (e.g., via driver 708). The uplink transmission can be processed at the data layer 706 to generate MAC layer PDUs, and to the PHY layer 702 for transmission as a signal to another network node.

In this example, the MAC layer 604 can determine to wake up the host processor 144 based on detecting the uplink transmission 714, at 716, and can determine the time to trigger the wakeup at 718. As described, MAC layer 704 can determine the time to trigger wakeup based at least in part on a RTT 720 known between transmitting uplink data and receiving corresponding downlink data. MAC layer 704 can use additional parameters to determine the wakeup time to trigger, which can be offset from the time of sending uplink transmission 714 and may also include considering downlink processing time, wakeup latency associated with the host processor 144, etc. MAC layer 704 can send a wakeup request 722 to the host processor 144 (via driver 708) after the determine time to trigger has elapsed. The host processor 144 can accordingly initiate host wakeup based on receiving the request 722, and can wakeup after the host wakeup time 724 at 726. The modem processor can receive downlink data 728 from the other network node, and can forward the data to host processor 144 for processing, and the host processor 144 can be in the increased power consumption state to process the downlink data based on the aspects described above.

FIG. 5 illustrates a flow chart of another example of a method 500 for activating an increased power consumption state. In an example, a UE 104, and/or more specifically one or more host processors 144, can perform the functions described in method 500 using one or more of the components described in FIGS. 1-2.

In method 500, at Block 502, an instruction to utilize an increased power consumption state for processing data from a network node can be received from a modem processor. In an aspect, power state switching component 252, e.g., in conjunction with memory 216, transceiver 202, modem 140, host processor(s) 144, etc., can receive, from the modem processor (e.g., modem processor(s) 142), an instruction to utilize the increased power consumption state for processing data from the network node. As described, for example, the modem processor(s) 142 can send an early wakeup command to the host processor(s) 144 to cause the host processor(s) 144 to switch from a decreased power consumption state to the increased power consumption state. In addition, in an example, the instruction can include a time for remaining in the increased power consumption state (e.g., to allow enough time for the host processor(s) 144 to receive and process data before entering the decreased power consumption state). Moreover, as described, host processor(s) 144 can operate in the decreased power consumption state by removing power from certain components for a period of time, while maintaining power to other components for receiving the instruction from the modem processor and/or other instructions.

In method 500, at Block 504, the increased power consumption state can be activated for a duration corresponding to the instruction. In an aspect, power state switching component 252, e.g., in conjunction with memory 216, transceiver 202, modem 140, host processor(s) 144, etc., can activate the increased power consumption state for the duration corresponding to the instruction. Thus, the host processor(s) 144 can operate in the increased power consumption state for the duration to receive and process data from the modem processor(s) 142.

In method 500, at Block 506, data received in a signal from the network node can be received from the modem processor while utilizing the increased power consumption state. In an aspect, host processor(s) 144, e.g., in conjunction with memory 216, transceiver 202, modem 140, etc., can receive, from the modem processor(s) 142 and while utilizing the increased power consumption state, data received in the signal from the network node. As described, the host processor(s) 144 can accordingly be awake to process this data.

In addition, in method 500, at Block 508, a time at which the host processor is to utilize the increased power consumption state can be indicated to the modem processor. In an aspect, power state switching component 252, e.g., in conjunction with memory 216, transceiver 202, modem 140, host processor(s) 144, etc., can indicate, to the modem processor(s) 142, a time at which the host processor is to utilize the increased power consumption state. In this regard, for example, the modem processor(s) 142 can determine when to send packets to the host processor(s) 144 for processing while the host processors(s) 144 are in the increased power consumption state. For example, the host processor(s) 144 can indicate its expected wakeup time to the modem processor(s) 142.

Figure 8:
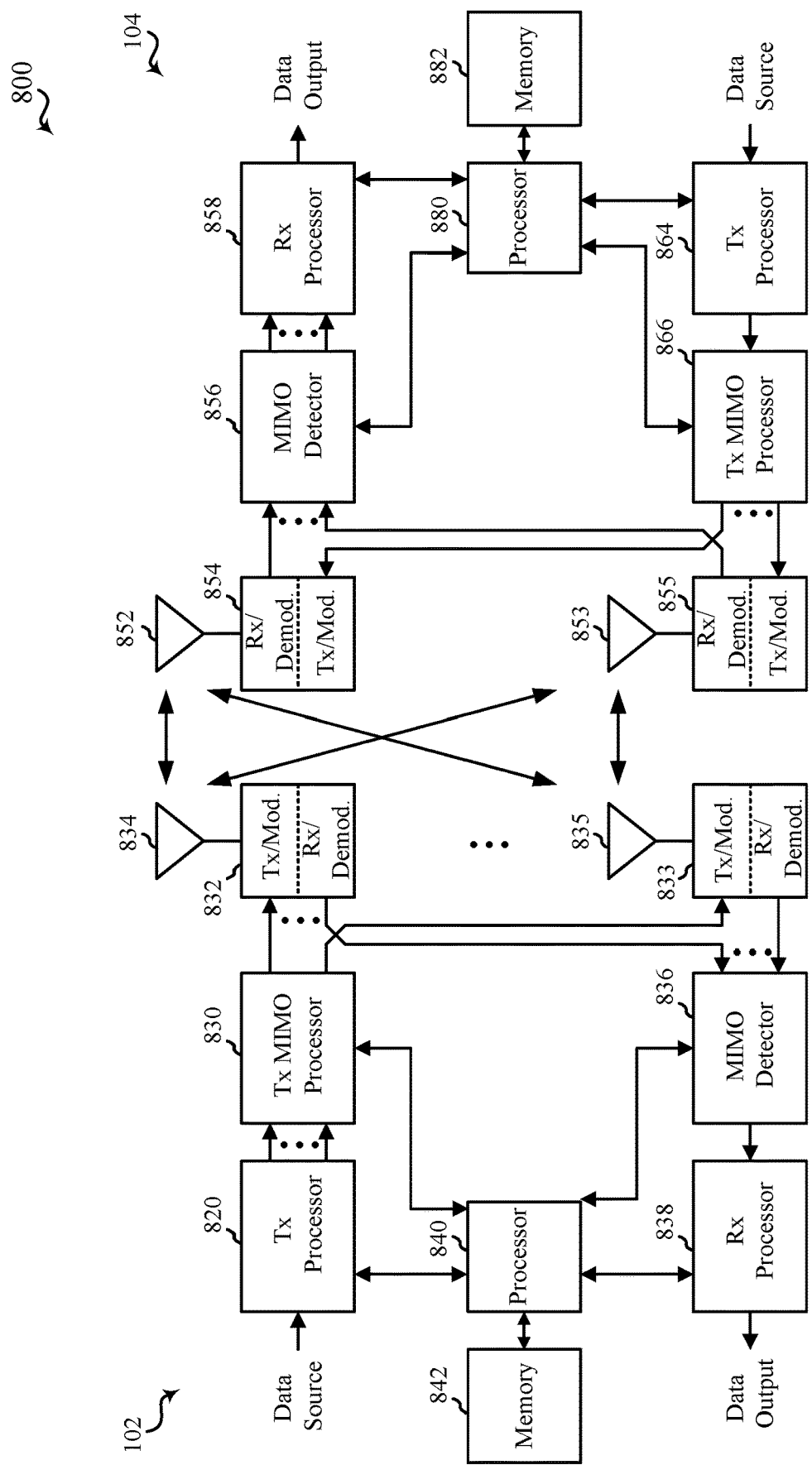
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases be or include the host processor(s) 144 (see e.g., FIGS. 1 and 2), and Rx processor 858, Tx processor 864, Tx MIMO processor 866, etc. may be or include the modem processor(s) 142, described above, etc.

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 800.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
receiving a control signal from a network node, wherein the control signal comprises a control channel assigning resources for receiving a corresponding data signal, and wherein the control channel indicates one or more properties of the corresponding data signal;
receiving the corresponding data signal on the assigned resources;
instructing, from a layer of a modem processor and based at least on the one or more properties of the corresponding data signal, a host processor to utilize an increased power consumption state for processing data from the corresponding data signal received from the network node at a time before the modem processor completes processing of the corresponding data signal; and sending, subsequent to and based on instructing the host processor to utilize the increased power consumption state, the data received in the corresponding data signal from the network node to the host processor.

2. The method of claim 1, wherein the one or more properties of the corresponding data signal include a duration of a transmit time interval (TTI) of the data signal.

3. The method of claim 1, wherein the one or more properties of the corresponding data signal include a type of one or more radio bearers active for receiving the corresponding data signal.

4. The method of claim 1, wherein the one or more properties of the corresponding data signal include a size of a received transport block.

5. The method of claim 1, wherein the one or more properties of the corresponding data signal include a modulation and coding scheme (MCS), and wherein instructing the host processor to utilize the increased power consumption state is based on comparing a signal quality of the corresponding data signal to the MCS.

6. The method of claim 1, wherein instructing the host processor to utilize the increased power consumption state is further based on the control signal having at least a threshold energy.

7. The method of claim 1, wherein instructing the host processor to utilize the increased power consumption state includes indicating a duration during which the host processor is to utilize the increased power consumption state.

8. The method of claim 1, further comprising receiving, from the host processor and based on instructing the host processor to utilize the increased power consumption state, an indication of a time at which the host processor is to utilize the increased power consumption state.

9. The method of claim 1, further comprising instructing, from the layer of the modem processor and based at least on the one or more properties of the corresponding data signal, at least one of a shared memory, a memory controller, a memory access module, or a bus to utilize a different power consumption state.

10. An apparatus for wireless communication, comprising:
    a transceiver;
    a memory; and
    at least one processor communicatively coupled with the transceiver and the memory, wherein the at least one processor is configured to:
        receive a control signal from a network node, wherein the control signal comprises a control channel assigning resources for receiving a corresponding data signal, and wherein the control channel indicates one or more properties of the corresponding data signal;
        receive the corresponding data signal on the assigned resources;
        instruct, from a layer of a modem processor and based at least on the one or more properties of the corresponding data signal, a host processor to utilize an increased power consumption state for processing data from the corresponding data signal received from the network node at a time before the modem processor completes processing of the corresponding data signal; and
        send, subsequent to and based on instructing the host processor to utilize the increased power consumption state, the data received in the corresponding data signal from the network node to the host processor.

11. The apparatus of claim 10, wherein the one or more properties of the corresponding data signal include a duration of a transmit time interval (TTI) of the data signal.

12. The apparatus of claim 10, wherein the one or more properties of the corresponding data signal include a type of one or more radio bearers active for receiving the corresponding data signal.

13. The apparatus of claim 10, wherein the one or more properties of the corresponding data signal include a size of a received transport block.

14. The apparatus of claim 10, wherein the one or more properties of the corresponding data signal include a modulation and coding scheme (MCS), and wherein the at least one processor is configured to instruct the host processor to utilize the increased power consumption state based on comparing a signal quality of the corresponding data signal to the MCS.

15. The apparatus of claim 10, wherein the at least one processor is configured to instruct the host processor to utilize the increased power consumption state further based on the control signal having at least a threshold energy.

16. The apparatus of claim 10, wherein the at least one processor is configured to instruct the host processor to utilize the increased power consumption state including indicating a duration during which the host processor is to utilize the increased power consumption state.

17. The apparatus of claim 10, wherein the at least one processor is further configured to receive, from the host processor and based on instructing the host processor to utilize the increased power consumption state, an indication of a time at which the host processor is to utilize the increased power consumption state.

18. The apparatus of claim 10, wherein the at least one processor is further configured to instruct, from the layer of the modem processor and based at least on the one or more properties of the corresponding data signal, at least one of a shared memory, a memory controller, a memory access module, or a bus to utilize a different power consumption state.

19. An apparatus for wireless communication, comprising:
    means for receiving a control signal from a network node, wherein the control signal comprises a control channel assigning resources for receiving a corresponding data signal, and wherein the control channel indicates one or more properties of the corresponding data signal;
    means for receiving the corresponding data signal on the assigned resources;
    means for instructing, from a layer of a modem processor and based at least on the one or more properties of the corresponding data signal, a host processor to utilize an increased power consumption state for processing data from the corresponding data signal received from the network node at a time before the modem processor completes processing of the corresponding data signal; and
    means for sending, subsequent to and based on instructing the host processor to utilize the increased power consumption state, the data received in the corresponding data signal from the network node to the host processor.

20. The apparatus of claim 19, wherein the one or more properties of the corresponding data signal include a duration of a transmit time interval (TTI) of the data signal.

* * * * *